No. 711,307. Patented Oct. 14, 1902.
A. S. HAMILTON.
PROCESS OF EXTRACTING OIL FROM FISH LIVERS.
(Application filed Feb. 1, 1902.)
(No Model.)

Witnesses

Inventor
A. S. Hamilton
By John J. Halsted
his Attorneys

UNITED STATES PATENT OFFICE.

ALEXANDER S. HAMILTON, OF NEEDHAM, MASSACHUSETTS.

PROCESS OF EXTRACTING OIL FROM FISH-LIVERS.

SPECIFICATION forming part of Letters Patent No. 711,307, dated October 14, 1902.

Application filed February 1, 1902. Serial No. 92,138. (No specimens.)

*To all whom it may concern:*

Be it known that I, ALEXANDER S. HAMILTON, a citizen of the United States, residing at Needham, in the county of Norfolk and State of Massachusetts, have invented certain new and useful Improvements in Processes of Extracting Oil from Fish-Livers; and I do hereby declare the following to be a full, clear, and exact description of the invention, such as will enable others skilled in the art to which it appertains to make and use the same.

The state of the art of extracting oil from fish-livers as known to me up to this time and prior to my present invention consists of two methods: first, allowing livers to decompose, whereby the oil-cells are destroyed and the oil set free; second, by cooking the livers in various ways—in kettles over direct fire, and steam-jacket kettles, and under steam-pressure in digesters. By the first method the oil obtained or secured is of a very dark color and strong flavor. By the second method the oil obtained is of much lighter color, the shade of color depending in part upon the degree of heat applied. Cod-liver oil for medicinal purposes requires to be light in color and of a bland or pleasant flavor, and the product of Norway has been set as a standard for the domestic refiners to meet. By the present method of extracting the oil under heat both the color and the flavor of the oil are affected to the detriment of the oil, and in order to overcome these serious objections it is the practice of the various refiners in this country to resort to bleaching and refining methods, perhaps the most common being the use of fullers' earth. This material, while accomplishing the purpose to a certain extent, imparts still a different but unpleasant flavor to the oil.

Figure 1:
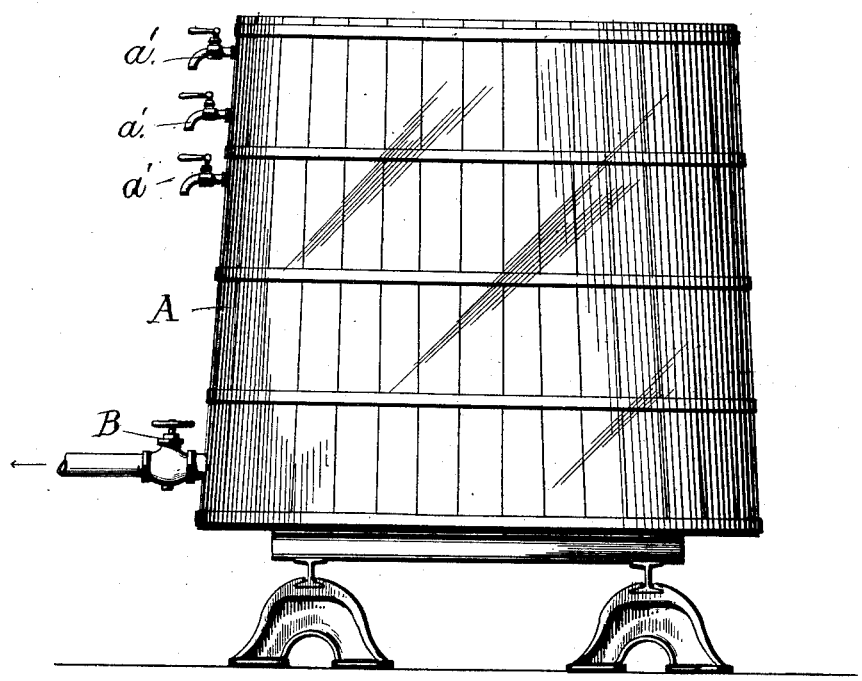
Figure 2:
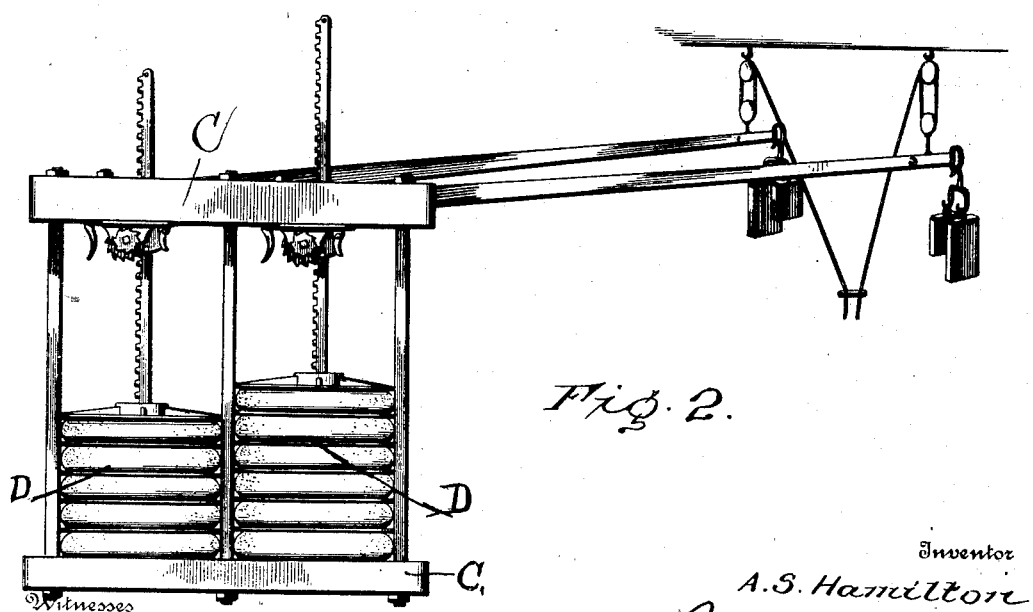

Figure 1 illustrates an open tank, which may be round or square or which may be a receptacle of any kind adapted to hold the livers. Fig. 2 illustrates an ordinary press adapted for pressing the bags containing the mass between plates.

A, Fig. 1, indicates a tank, $a'$ $a'$ $a'$ several cocks in the same, and B a large outlet and its cock. This tank should, as shown, for convenience be raised from the ground to permit of easy working.

In Fig. 2, C represents one of many well-known forms of press; but any suitable press for pressing material of this kind can be used. D indicates the bags.

I make no claim whatever to the tank or to the press, as they form no part of my invention.

By the usual methods of extracting the oil only part of the product is suitable for medicinal oil, the balance, due to the need of greater heat in order to break down the oil-cells, being only suitable for manufacturing purposes.

Having now stated some of the defects and objections in existing practices in the art, I will now set forth my improvements.

The livers are by my method taken as soon after their removal from the fish as practicable or while still fresh, or, more properly speaking, while sweet, and either in their original or natural shape or after cutting or breaking into small pieces are treated with chlorid of sodium or common salt, either the dry salt or in the form of a brine of sufficient strength to accomplish the purpose, which is to break down or destroy the oil-cells and free the oil without the aid of artificial heat applied in any form, there being no heat other than that of the natural temperature of the atmosphere.

The quantity of salt used should be about one-tenth, or thereabout, in weight relatively to the weight of livers, and the salt may be placed upon the mass of livers or alternately with layers of them or submerged in saturated brine. The mass is then allowed to stand, say, twenty-four to seventy-two hours, according to temperature, some oil rising to the surface in perfect condition.

At ordinary temperature—say 60° Fahrenheit—the oil begins within a few hours to appear on the surface of the receptacle or vessel in which the livers have been placed, and after allowing the livers to stand sufficiently long for the salt to accomplish its purpose and which is largely determined by the temperature of the atmosphere the oil on the surface is removed and the mass of livers remaining is placed in bags and submitted to pressure in the usual manner now practiced for the purpose of securing the balance of the oil.

By this method the entire quantity of oil contained in the livers is removed, and it is all of one uniform quality, very light in color, and free from any and all disagreeable flavor other than the natural flavor of the oil as it exists in the new or fresh livers.

When this process is carried on at a low temperature of the atmosphere—say 40° Fahrenheit—the oil resulting is quite free from stearin and will stand ordinary cold without chilling, thereby making it unnecessary to chill and cold-press the oil for many purposes.

While the use of salt keeps the livers sweet, it does not "preserve" them in the sense in which we understand that term, for the reason that its action is to destroy the oil-cells, and consequently as soon as the process is begun the character of the livers undergoes a change.

While the livers may be cooked in the usual manner after the salting, yet it is not possible in such case to preserve the natural color and flavor of the product.

In brief, the following, besides others, may be enumerated as important advantages resulting from my process, viz: the avoiding of decomposition of the livers; avoiding any use or need of cooking devices, kettles, or digesters and of artificial heat or steam; the avoiding of dark colors and strong flavors in the oil product; the preservation of the natural color and flavor; the easier yielding of the oil from the livers, and an increased yield of high-grade oil from a given bulk or quantity of livers—in fact, the procuring of the entire quantity of oil from the livers and of the highest grade and without the aid of artificial heat; an equally large yield and of better quality of the oil than by present methods, even if the livers treated be not perfectly fresh; the more complete destruction of the oil-cells of the livers; at a low temperature having the oil free from stearin and rendering the oil free from chilling; bleaching and use of fullers' earth to refine the oil need not be used. As I treat the livers when they are fresh and sweet, the object of the salt is therefore not for curing them nor for salting them down, as in curing meats, &c., my object being quite foreign to it.

Although I do not contemplate using any but fresh sweet livers, yet if perchance some of them should have been left a little too long before being treated by my new described method or process it will not interfere with its ultimate result in securing the entire yield of oil; but it will be of inferior quality.

I claim—

1. The described process of extracting oil from fresh fish-livers, consisting in treating them at ordinary temperatures and without artificial heat, with chlorid of sodium or common salt, applied to the livers as set forth, to break down or destroy the oil-cells of the livers and to set free the oil from the livers, and then withdrawing the oil directly from the livers.

2. The described process of extracting oil from fish-livers, consisting in placing together alternate layers of livers and of common salt, or saturated brine, allowing this composite mass to stand at the ordinary temperature of the atmosphere, and free from artificial heat, then removing the oil that has risen on such mass, and submitting said mass to pressure to secure the balance of the oil.

In testimony whereof I have affixed my signature in presence of two witnesses.

ALEXANDER S. HAMILTON.

Witnesses:
ALONZO C. HOWES,
FRANK K. NEAL.